(12) United States Patent
Basso et al.

(10) Patent No.: US 7,584,105 B2
(45) Date of Patent: Sep. 1, 2009

(54) METHOD AND SYSTEM FOR ALIGNING NATURAL AND SYNTHETIC VIDEO TO SPEECH SYNTHESIS

(75) Inventors: Andrea Basso, N. Long Branch, NJ (US); Mark Charles Beutnagel, Mendham, NJ (US); Joern Ostermann, Red Bank, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

(21) Appl. No.: 11/931,093

(22) Filed: Oct. 31, 2007

(65) Prior Publication Data
US 2008/0059194 A1 Mar. 6, 2008

Related U.S. Application Data

(60) Division of application No. 11/464,018, filed on Aug. 11, 2006, now Pat. No. 7,366,670, which is a continuation of application No. 11/030,781, filed on Jan. 7, 2005, now Pat. No. 7,110,950, which is a continuation of application No. 10/350,225, filed on Jan. 23, 2003, now Pat. No. 6,862,569, which is a continuation of application No. 08/905,931, filed on Aug. 5, 1997, now Pat. No. 6,567,779.

(51) Int. Cl.
*G10L 13/00* (2006.01)
*G10L 21/06* (2006.01)
*G06T 13/00* (2006.01)

(52) U.S. Cl. .................. 704/260; 704/270; 715/706
(58) Field of Classification Search .............. 704/258, 704/260, 270, 276, 278; 715/706, 203; 345/473; 348/512, 423.1
See application file for complete search history.

(56) References Cited

U.S. PATENT DOCUMENTS 4,520,501 A 5/1985 Dubrucq
(Continued)

FOREIGN PATENT DOCUMENTS

JP 63-225875 9/1988
(Continued)

OTHER PUBLICATIONS

Baris Uz, et al.; "Realistic Speech Animation of Synthetic Faces", *Proceedings Computer Animation '98*, Philadelphia, PA, USA, Jun. 8-10, 1998, pp. 111-118, XP002111637, IEEE Comput. Sco., Los Alamitos, CA, ISBN: 0-8186-8541-7, Section 6 ("Synchronizing Speech with Expressions"), pp. 115-116.

(Continued)

*Primary Examiner*—Martin Lerner

(57) ABSTRACT

According to MPEG-4's TTS architecture, facial animation can be driven by two streams simultaneously—text, and Facial Animation Parameters. In this architecture, text input is sent to a Text-To-Speech converter at a decoder that drives the mouth shapes of the face. Facial Animation Parameters are sent from an encoder to the face over the communication channel. The present invention includes codes (known as bookmarks) in the text string transmitted to the Text-to-Speech converter, which bookmarks are placed between words as well as inside them. According to the present invention, the bookmarks carry an encoder time stamp. Due to the nature of text-to-speech conversion, the encoder time stamp does not relate to real-world time, and should be interpreted as a counter. In addition, the Facial Animation Parameter stream carries the same encoder time stamp found in the bookmark of the text. The system of the present invention reads the bookmark and provides the encoder time stamp as well as a real-time time stamp to the facial animation system. Finally, the facial animation system associates the correct facial animation parameter with the real-time time stamp using the encoder time stamp of the bookmark as a reference.

12 Claims, 1 Drawing Sheet

U.S. PATENT DOCUMENTS

| | | | |
|---|---|---|---|
| 4,841,575 A | | 6/1989 | Welsh et al. |
| 4,884,972 A | | 12/1989 | Gasper |
| 5,111,409 A | | 5/1992 | Gasper et al. |
| 5,404,437 A | | 4/1995 | Nguyen |
| 5,467,139 A | * | 11/1995 | Lankford ................. 348/512 |
| 5,473,726 A | | 12/1995 | Marshall |
| 5,493,281 A | | 2/1996 | Owens |
| 5,598,352 A | * | 1/1997 | Rosenau et al. ............ 715/203 |
| 5,608,839 A | | 3/1997 | Chen |
| 5,623,587 A | | 4/1997 | Bulman |
| 5,634,084 A | | 5/1997 | Malsheen et al. |
| 5,657,426 A | | 8/1997 | Waters |
| 5,732,232 A | | 3/1998 | Brush, II et al. |
| 5,757,869 A | * | 5/1998 | Sands et al. ................. 375/366 |
| 5,793,365 A | | 8/1998 | Tang et al. |
| 5,802,220 A | | 9/1998 | Black et al. |
| 5,806,036 A | | 9/1998 | Stork |
| 5,812,126 A | | 9/1998 | Richardson |
| 5,812,201 A | * | 9/1998 | Yoo ........................ 348/423.1 |
| 5,815,634 A | * | 9/1998 | Daum et al. ................ 386/96 |
| 5,818,461 A | * | 10/1998 | Rouet et al. ................ 345/473 |
| 5,818,463 A | | 10/1998 | Tao et al. |
| 5,826,234 A | | 10/1998 | Lyberg |
| 5,878,396 A | | 3/1999 | Henton |
| 5,880,731 A | | 3/1999 | Liles |
| 5,884,029 A | | 3/1999 | Brush, II et al. |
| 5,907,328 A | | 5/1999 | Brush, II et al. |
| 5,920,835 A | | 7/1999 | Huzenlaub et al. |
| 5,923,337 A | * | 7/1999 | Yamamoto ................. 345/473 |
| 5,930,450 A | | 7/1999 | Fujita |
| 5,963,217 A | | 10/1999 | Grayson et al. |
| 5,970,459 A | | 10/1999 | Yang et al. |
| 5,977,968 A | | 11/1999 | Le Blanc |
| 5,983,190 A | | 11/1999 | Trower et al. |
| 6,177,928 B1 | | 1/2001 | Basso et al. |
| 6,477,239 B1 | | 11/2002 | Ohki et al. |
| 6,567,779 B1 | | 5/2003 | Basso et al. |
| 6,602,299 B1 | | 8/2003 | Basso et al. |
| 6,862,569 B1 | | 3/2005 | Basso et al. |
| 7,110,950 B2 | | 9/2006 | Basso et al. |
| 7,366,670 B1 | * | 4/2008 | Basso et al. ................. 704/260 |
| 2007/0223389 A1 | * | 9/2007 | Basso et al. ................. 370/252 |
| 2008/0312930 A1 | * | 12/2008 | Basso et al. ................. 704/260 |

FOREIGN PATENT DOCUMENTS

| | | |
|---|---|---|
| JP | 02-234285 | 9/1990 |
| JP | 07-078074 | 3/1995 |
| JP | 08-194494 | 7/1996 |
| JP | 09-016195 | 1/1997 |
| JP | 09-138767 | 5/1997 |
| JP | 09-160575 | 6/1997 |

OTHER PUBLICATIONS

Chiariglione, L., ISO/IEC/JTC 1/SC 29/WG11: "Report of the 43rd WG 11 Meeting", *Coding of Moving Pictures and Audio*; ISO/IEC JTC 1/SC 29/WG 11 N2114, Mar. 1998, XP002111638 International Organisation for Standardisation, p. 40, TTSI Section.

Chiariglione, L., "MPEG and Multimedia Communicatons"; *IEEE Transactions on Circuits and Systems for Video Technology*, vol. 7, No. 1, Feb. 1, 1997, pp. 5-18, XP000678876; ISSN 1051-8215, Sections VII and VIII, pp. 12-16.

Ostermann, J. et al., "Synchronisation between TTS and FAP based on bookmarks and timestamps", International Organization for Standarization, Coding of Moving Pictures and Associated Audio Information, ISO/IEC/JTC1/SC29/WG11 MPEG 97/1919, Bristol, Apr. 1997, five pages.

"International Standard of MPEG/Multimedia Coding" by Hiroshi Yasuda et al., Maruzen Company, Limited, Japan, Sep. 30, 1994, First Edition, pp. 149-154.

"Concept of Multi-Layered Speech/Sound Synthesis Control Language" by Osamu Mizuno et al., Technical Report of IEICE, Institute of Electronics, Information and Communication Engineers, Japan, May 22, 1997, Vo. 97, No. 64 (SP97-1~9), pp. 21 to 26.

* cited by examiner

METHOD AND SYSTEM FOR ALIGNING NATURAL AND SYNTHETIC VIDEO TO SPEECH SYNTHESIS

PRIORITY APPLICATION

The present application is a divisional of U.S. patent application Ser. No. 11/464,018 filed on Aug. 11, 2006, now U.S. Pat. No. 7,366,670, issued Apr. 29, 2008, which is a continuation of U.S. patent application Ser. No. 11/030,781 filed on Jan. 7, 2005, now U.S. Pat. No. 7,110,950, issued Sep. 19, 2006, which is a continuation of U.S. Non-provisional patent application Ser. No. 10/350,225 filed on Jan. 23, 2003, now U.S. Pat. No. 6,862,569, issued Mar. 1, 2005, which is a continuation of U.S. Non-provisional patent application Ser. No. 08/905,931 filed on Aug. 5, 1997, now U.S. Pat. No. 6,567,779, issued May 20, 2003, the contents of which are incorporated herein by reference in their entirety.

BACKGROUND OF THE INVENTION

The present invention relates generally to methods and systems for coding of images, and more particularly to a method and system for coding images of facial animation.

According to MPEG-4's TTS architecture, facial animation can be driven by two streams simultaneously—text, and Facial Animation Parameters (FAPs). In this architecture, text input is sent to a Text-To-Speech (TTS) converter at a decoder that drives the mouth shapes of the face. FAPs are sent from an encoder to the face over the communication channel. Currently, the Verification Model (VM) assumes that synchronization between the input side and the FAP input stream is obtained by means of timing injected at the transmitter side. However, the transmitter does not know the timing of the decoder TTS. Hence, the encoder cannot specify the alignment between synthesized words and the facial animation. Furthermore, timing varies between different TTS systems. Thus, there currently is no method of aligning facial mimics (e.g., smiles, and expressions) with speech.

The present invention is therefore directed to the problem of developing a system and method for coding images for facial animation that enables alignment of facial mimics with speech generated at the decoder.

SUMMARY OF THE INVENTION

The present invention solves this problem by including codes (known as bookmarks) in the text string transmitted to the Text-to-Speech (TTS) converter, which bookmarks can be placed between words as well as inside them. According to the present invention, the bookmarks carry an encoder time stamp (ETS). Due to the nature of text-to-speech conversion, the encoder time stamp does not relate to real-world time, and should be interpreted as a counter. In addition, according to the present invention, the Facial Animation Parameter (FAP) stream carries the same encoder time stamp found in the bookmark of the text. The system of the present invention reads the bookmark and provides the encoder time stamp as well as a real-time time stamp (RTS) derived from the timing of its TTS converter to the facial animation system. Finally, the facial animation system associates the correct facial animation parameter with the real-time time stamp using the encoder time stamp of the bookmark as a reference. In order to prevent conflicts between the encoder time stamps and the real-time time stamps, the encoder time stamps have to be chosen such that a wide range of decoders can operate.

Therefore, in accordance with the present invention, a method for encoding a facial animation including at least one facial mimic and speech in the form of a text stream, comprises the steps of assigning a predetermined code to the at least one facial mimic, and placing the predetermined code within the text stream, wherein said code indicates a presence of a particular facial mimic. The predetermined code is a unique escape sequence that does not interfere with the normal operation of a text-to-speech synthesizer.

One possible embodiment of this method uses the predetermined code as a pointer to a stream of facial mimics thereby indicating a synchronization relationship between the text stream and the facial mimic stream.

One possible implementation of the predetermined code is an escape sequence, followed by a plurality of bits, which define one of a set of facial mimics. In this case, the predetermined code can be placed in between words in the text stream, or in between letters in the text stream.

Another method according to the present invention for encoding a facial animation includes the steps of creating a text stream, creating a facial mimic stream, inserting a plurality of pointers in the text stream pointing to a corresponding plurality of facial mimics in the facial mimic stream, wherein said plurality of pointers establish a synchronization relationship with said text and said facial mimics.

According to the present invention, a method for decoding a facial animation including speech and at least one facial mimic includes the steps of monitoring a text stream for a set of predetermined codes corresponding to a set of facial mimics, and sending a signal to a visual decoder to start a particular facial mimic upon detecting the presence of one of the set of predetermined codes.

According to the present invention, an apparatus for decoding an encoded animation includes a demultiplexer receiving the encoded animation, outputting a text stream and a facial animation parameter stream, wherein said text stream includes a plurality of codes indicating a synchronization relationship with a plurality of mimics in the facial animation parameter stream and the text in the text stream, a text to speech converter coupled to the demultiplexer, converting the text stream to speech, outputting a plurality of phonemes, and a plurality of real-time time stamps and the plurality of codes in a one-to-one correspondence, whereby the plurality of real-time time stamps and the plurality of codes indicate a synchronization relationship between the plurality of mimics and the plurality of phonemes, and a phoneme to video converter being coupled to the text to speech converter, synchronizing a plurality of facial mimics with the plurality of phonemes based on the plurality of real-time time stamps and the plurality of codes.

In the above apparatus, it is particularly advantageous if the phoneme to video converter includes a facial animator creating a wireframe image based on the synchronized plurality of phonemes and the plurality of facial mimics, and a visual decoder being coupled to the demultiplexer and the facial animator, and rendering the video image based on the wireframe image.

DETAILED DESCRIPTION

According to the present invention, the synchronization of the decoder system can be achieved by using local synchronization by means of event buffers at the input of FA/AP/MP and the audio decoder. Alternatively, a global synchronization control can be implemented.

A maximum drift of 80 msec between the encoder time stamp (ETS) in the text and the ETS in the Facial Animation Parameter (FAP) stream is tolerable.

One embodiment for the syntax of the bookmarks when placed in the text stream consists of an escape signal followed by the bookmark content, e.g., \!M {bookmark content}. The bookmark content carries a 16-bit integer time stamp ETS and additional information. The same ETS is added to the corresponding FAP stream to enable synchronization. The class of Facial Animation Parameters is extended to carry the optional ETS.

If an absolute clock reference (PCR) is provided, a drift compensation scheme can be implemented. Please note, there is no master slave notion between the FAP stream and the text. This is because the decoder might decide to vary the speed of the text as well as a variation of facial animation might become necessary, if an avatar reacts to visual events happening in its environment.

For example, if Avatar 1 is talking to the user. A new Avatar enters the room. A natural reaction of avatar 1 is to look at avatar 2, smile and while doing so, slowing down the speed of the spoken text.

Autonomous Animation Driven Mostly by Text

In the case of facial animation driven by text, the additional animation of the face is mostly restricted to events that do not have to be animated at a rate of 30 frames per second. Especially high-level action units like smile should be defined at a much lower rate. Furthermore, the decoder can do the interpolation between different action units without tight control from the receiver.

The present invention includes action units to be animated and their intensity in the additional information of the bookmarks. The decoder is required to interpolate between the action units and their intensities between consecutive bookmarks.

This provides the advantages of authoring animations using simple tools, such as text editors, and significant savings in bandwidth.

Figure 1:
FIG. 1 depicts the environment in which the present invention will be applied.

FIG. 1 depicts the environment in which the present invention is to be used. The animation is created and coded in the encoder section 1. The encoded animation is then sent through a communication channel (or storage) to a remote destination. At the remote destination, the animation is recreated by the decoder 2. At this stage, the decoder 2 must synchronize the facial animations with the speech of the avatar using only information encoded with the original animation.

Figure 2:
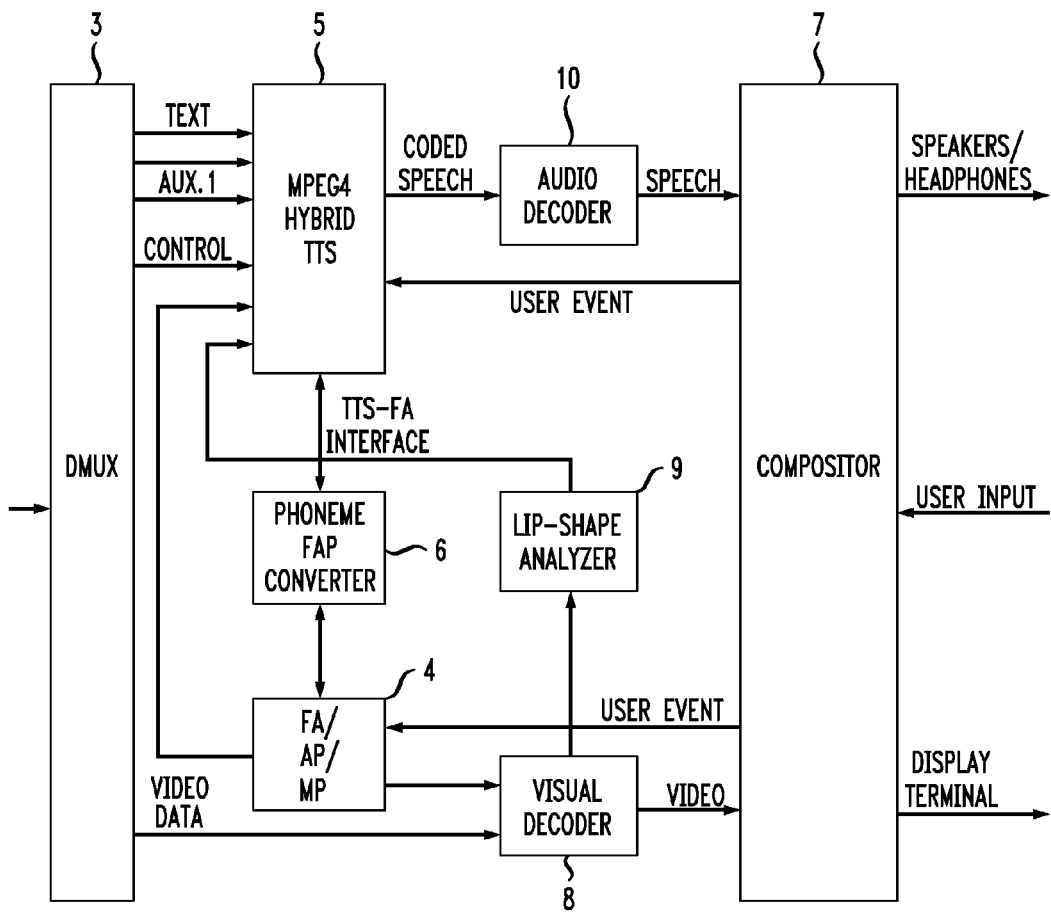
FIG. 2 depicts the architecture of an MPEG-4 decoder using text-to-speech conversion.

FIG. 2 depicts the MPEG-4 architecture of the decoder, which has been modified to operate according to the present invention. The signal from the encoder 1 (not shown) enters the Demultiplexer (DMUX) 3 via the transmission channel (or storage, which can also be modeled as a channel). The DMUX 3 separates outs the text and the video data, as well as the control and auxiliary information. The FAP stream, which includes the Encoder Time Stamp (ETS), is also output by the DMUX 3 directly to the FA/AP/MP 4, which is coupled to the Text-to-Speech Converter (TTS) 5, a Phoneme FAP converter 6, a compositor 7 and a visual decoder 8. A Lip Shape Analyzer 9 is coupled to the visual decoder 8 and the TTS 5. User input enters via the compositor 7 and is output to the TTS 5 and the FA/AP/MP 4. These events include start, stop, etc.

The TTS 4 reads the bookmarks, and outputs the phonemes along with the ETS as well as with a Real-time Time Stamp (RTS) to the Phoneme FAP Converter 6. The phonemes are used to put the vertices of the wireframe in the correct places. At this point the image is not rendered.

This data is then output to the visual decoder 8, which renders the image, and outputs the image in video form to the compositor 7. It is in this stage that the FAPs are aligned with the phonemes by synchronizing the phonemes with the same ETS/RTS combination with the corresponding FAP with the matching ETS.

The text input to the MPEG-4 hybrid text-to-speech (TTS) converter 5 is output as coded speech to an audio decoder 10. In this system, the audio decoder 10 outputs speech to the compositor 7, which acts as the interface to the video display (not shown) and the speakers (not shown), as well as to the user.

On the video side, video data output by the DMUX 3 is passed to the visual decoder 8, which creates the composite video signal based on the video data and the output from the FA/AP/MP 4.

There are two different embodiments of the present invention. In a first embodiment, the ETS placed in the text stream includes the facial animation. That is, the bookmark (escape sequence) is followed by a 16 bit codeword that represents the appropriate facial animation to be synchronized with the speech at this point in the animation.

Alternatively, the ETS placed in the text stream can act as a pointer in time to a particular facial animation in the FAP stream. Specifically, the escape sequence is followed by a 16 bit code that uniquely identifies a particular place in the FAP stream.

While the present invention has been described in terms of animation data, the animation data could be replaced with natural audio or video data. More specifically, the above description provides a method and system for aligning animation data with text-to-speech data. However, the same method and system applies if the text-to-speech data is replaced with audio or video. In fact, the alignment of the two data streams is independent of the underlying data, at least with regard to the TTS stream.

Although the above description may contain specific details, they should not be construed as limiting the claims in any way. Other configurations of the described embodiments of the invention are part of the scope of this invention. For example, while facial mimics are primarily discussed, the mimics may also relate to any animation feature or mimic. Accordingly, the appended claims and their legal equivalents should only define the invention, rather than any specific examples given.

We claim:

1. A method of decoding data, the method comprising:
    monitoring a first stream of data for a predetermined code that is associated with an animation mimic transmittal within a second stream; and
    transmitting a signal to a decoder to start an animation using at least the animation mimic from the second stream and associated with the predetermined code.

2. The method of claim 1, wherein the predetermined code in the first stream that is associated with the animation mimic in the second stream indicates a synchronization relationship between the first stream and the second stream.

3. The method of claim 1, wherein the first stream is a text stream and the second stream is an animation mimic stream.

4. The method of claim 1, wherein the animation mimic is a facial mimic.

5. The method of claim 1, wherein the predetermined code is placed according to one of: between words in the first stream, inside words in the first stream, or between phonemes within the first stream.

6. The method of claim 1, wherein the predetermined code points to the animation mimic.

7. A decoder comprising:
 a module that decodes a predetermined code from a first stream that is associated with an animation mimic within a second stream; and
 a module that starts an animation using the animation mimic based on the decoded predetermined code.

8. The decoder of claim 7, wherein the predetermined code in the first stream being associated with the animation mimic in the second stream indicates a synchronization relationship between the first stream and the second stream.

9. The decoder of claim 7, wherein the first stream is a text stream and the second stream is an animation mimic stream.

10. The decoder of claim 7, wherein a correspondence between the predetermined code and the animation mimic is established during an encoding process of the first stream.

11. The decoder of claim 7, wherein the animation mimic is a facial mimic.

12. The decoder of claim 7, wherein the predetermined code points to the animation mimic.

* * * * *